US008904548B2

(12) United States Patent
Ohgushi (10) Patent No.: US 8,904,548 B2
(45) Date of Patent: Dec. 2, 2014

(54) INFORMATION TERMINAL APPARATUS FOR INFORMATION LEAK MONITORING

(75) Inventor: Nobuo Ohgushi, Takamatsu (JP)

(73) Assignee: Fujitsu Limited, Kawasaki (JP)

( * ) Notice: Subject to any disclaimer, the term of this patent is extended or adjusted under 35 U.S.C. 154(b) by 887 days.

(21) Appl. No.: 12/410,026

(22) Filed: Mar. 24, 2009

(65) Prior Publication Data

US 2009/0249496 A1    Oct. 1, 2009

(30) Foreign Application Priority Data

Mar. 31, 2008    (JP) .................................. 2008-089661

(51) Int. Cl.
*G06F 7/04*      (2006.01)
*G06F 21/31*     (2013.01)
*G06F 21/55*     (2013.01)

(52) U.S. Cl.
CPC .............. *G06F 21/31* (2013.01); *G06F 21/552* (2013.01)
USPC ............................ 726/27; 711/100; 709/224

(58) Field of Classification Search
CPC ......... G06F 21/30; G06F 21/31; G06F 21/50; G06F 21/55; G06F 21/552; G06F 21/554; G06F 21/60; G06F 21/62; G06F 21/6218; G06F 21/70; G06F 21/71; G06F 21/74; H04L 9/002
USPC ........... 726/26–30, 33–34, 2–5, 7, 16–17, 19, 726/21–23; 713/2, 100, 182–183, 185–186; 340/430; 725/29; 711/100, 152; 709/224
See application file for complete search history.

(56) References Cited

U.S. PATENT DOCUMENTS 5,014,234 A * 5/1991 Edwards, Jr. ................... 726/33
5,042,067 A * 8/1991 Moriyama ..................... 726/18
(Continued)

FOREIGN PATENT DOCUMENTS

JP    2000-78127 A    3/2000
JP    2001-134535 A   5/2001
(Continued)

OTHER PUBLICATIONS

Bergadano, Francesco et al. "User Authentication through Keystroke Dynamics" [Online], Nov. 2002 [Retrieved on Sep. 28, 2011], University of Torino, ACM Transactions on Information and System Security, vol. 5, No. 4, pp. 367-397 [Retrieved from: http://delivery. acm.org/10.1145/590000/581272/p367-bergadano.pdf?ip=151.207. 242.4&CFID=45360703&CFTOKEN=65969850&_acm_= 1317256137_79c9b9796546fac742a12f9cfae8ab1f].*

(Continued)

*Primary Examiner* — Michael Chao
*Assistant Examiner* — Eric W Shepperd
(74) *Attorney, Agent, or Firm* — Fujitsu Patent Center (57) ABSTRACT

There is provided an information terminal apparatus including a detecting unit that detects whether authentication information has been input within a given period of time or not, a determining unit that determines whether the authentication information agrees with given authentication information or not, a processing unit that performs processing in a first mode if the authentication information is not detected by the detecting unit within the given period of time or if the authentication information is detected by the detecting unit within the given period of time but the determining unit determines that it does not agree with the given authentication information, and a log processing unit that memorizes/stores operation history information operated while the processing in the first mode is being performed.

8 Claims, 5 Drawing Sheets

(56) References Cited

U.S. PATENT DOCUMENTS

| | | | | |
|---|---|---|---|---|
| 5,193,641 | A | * | 3/1993 | Durrell .................. 180/287 |
| 5,335,748 | A | * | 8/1994 | Wilson .................. 180/270 |
| 5,539,377 | A | * | 7/1996 | Dillon ................ 340/426.11 |
| 5,574,425 | A | * | 11/1996 | Shu .................... 340/426.12 |
| 5,731,575 | A | * | 3/1998 | Zingher et al. ........... 235/379 |
| 6,000,030 | A | * | 12/1999 | Steinberg et al. ........... 726/28 |
| 6,202,153 | B1 | * | 3/2001 | Diamant et al. ........... 726/35 |
| 6,679,422 | B2 | * | 1/2004 | Brown et al. ............. 235/379 |
| 6,711,687 | B1 | * | 3/2004 | Sekiguchi ................. 726/23 |
| 6,968,459 | B1 | * | 11/2005 | Morgan et al. ............ 713/189 |
| 7,546,639 | B2 | * | 6/2009 | Bantz et al. ................ 726/27 |
| 7,562,397 | B1 | * | 7/2009 | Mithal et al. ............... 726/33 |
| 7,797,728 | B2 | * | 9/2010 | Poisner ...................... 726/2 |
| 7,890,997 | B2 | * | 2/2011 | Walker et al. .............. 726/18 |
| 2004/0143750 | A1 | * | 7/2004 | Kulack et al. ............. 713/200 |
| 2004/0164848 | A1 | * | 8/2004 | Hwang et al. ............. 340/5.82 |
| 2005/0022005 | A1 | * | 1/2005 | McKeeth .................. 713/200 |
| 2005/0268095 | A1 | * | 12/2005 | O'Connor ................. 713/167 |
| 2007/0094679 | A1 | * | 4/2007 | Shuster ....................... 725/31 |
| 2007/0250920 | A1 | * | 10/2007 | Lindsay ........................ 726/7 |
| 2008/0155681 | A1 | * | 6/2008 | Mukouchi .................. 726/17 |
| 2009/0217036 | A1 | * | 8/2009 | Irwin et al. ................. 713/168 |
| 2013/0124874 | A1 | * | 5/2013 | Kudelski ..................... 713/189 |

FOREIGN PATENT DOCUMENTS

| | | |
|---|---|---|
| JP | 2004-295386 A | 10/2004 |
| JP | 2006-011959 A | 1/2006 |
| JP | 2006-014158 A | 1/2006 |
| JP | 2007-019566 A | 1/2007 |

OTHER PUBLICATIONS

Japanese Office Action mailed Aug. 28, 2012 for corresponding Japanese Application No. 2008-089661, with Partial English-language Translation.

Japanese Office Action mailed Apr. 16, 2013 for corresponding Japanese Application No. 2008-089661, with Partial English-language Translation.

* cited by examiner

| No. | NAME OF DATA | TIME |
|---|---|---|
| 1 | A | 2008.03.30.0100 |
| 2 | B | 2008.03.30.0130 |
| 3 | C | 2008.03.30.0131 |
| 4 | A | 2008.03.30.0200 |
| 5 | | |

Fig. 5A

| No. | ADDRESS | NAME OF DATA | TIME |
|---|---|---|---|
| 1 | aaa | A | 2008.03.30.0100 |
| 2 | bbb | B | 2008.03.30.0130 |
| 3 | ccc | C | 2008.03.30.0131 |
| 4 | aaa | A | 2008.03.30.0200 |
| 5 | | | |

Fig. 5B

INFORMATION TERMINAL APPARATUS FOR INFORMATION LEAK MONITORING

CROSS-REFERENCE TO RELATED APPLICATION

This application is based upon and claims the benefit of priority of the prior Japanese Patent Application No. 2008-089661, filed on Mar. 31, 2008, the entire contents of which are incorporated herein by reference.

FIELD

The embodiments discussed herein are directed to an information terminal apparatus including an information leak monitoring function added to an information terminal apparatus such as a personal computer.

BACKGROUND

In recent years, the functions of a personal computer have been improved, and even a small personal computer has a large-capacity storage device, which allows high-speed processing. The small and higher-performance personal computer has greatly improved portability, and there are an increased number of opportunities to store a large amount of data therein for use. The easy portability may also increase the number of opportunities for personal computers to be stolen or lost. In order to address such situations, various methods have been developed whereby data memorized/stored within a personal computer is not allowed to be accessed easily by a third party and a stolen or lost personal computer itself can be located.

For example, Japanese Laid-open Patent Publication 2006-14158 discloses a technology relating to a mobile terminal, which shows dummy data to a third party such that it cannot be apparent that the mobile terminal is operating in a security mode and whereby the operation histories by a third party can be tracked. Japanese Laid-open Patent Publication 2006-11959discloses an information terminal apparatus which implements user authentication with sufficiently high security, without using a password and without the addition of special hardware.

SUMMARY

It is an aspect of the embodiments discussed herein to provide an information terminal apparatus, such as a personal computer, which allows the use of the same without a user being aware of the fact that the personal computer is under security measures. Further, a notification of information on the position of the presence of the personal computer and/or how it is used based on the use itself is provided so that the personal computer can be recovered.

Additionally, whether confidential information stored in the personal computer has been leaked or not can be detected.

DESCRIPTION OF EMBODIMENTS

Japanese Laid-open Patent Publication No. 2006-14158 discloses that a false telephone directory may be displayed as dummy data. However, as is easily evident, the displayed telephone directory as dummy data may be detected as dummy data if a third party dials a telephone number displayed on the telephone directory once, which means the detection of the fact that the used mobile terminal is set in some mode for prevention against information leak. Then, there is a higher possibility that the setting in a security mode may be detected. Japanese Laid-open Patent Publication 2006-11959 is a method which displays a question for user authentication based on personal information to perform the authentication based on the answer. Though it may be difficult for a third party to answer correctly, it is apparent for the third party that the user authentication question is the function for authentication itself. Therefore, the method may include a problem that there is a higher possibility that the security may be broken by a third party putting his/her energies into answering the question. In this way, the main stream of technologies relating to the security for a mobile terminal such as a personal computer or a cellular phone, for example, may control use of or access to a personal computer with user authentication or dummy data and has the problems as described above.

Figure 1:
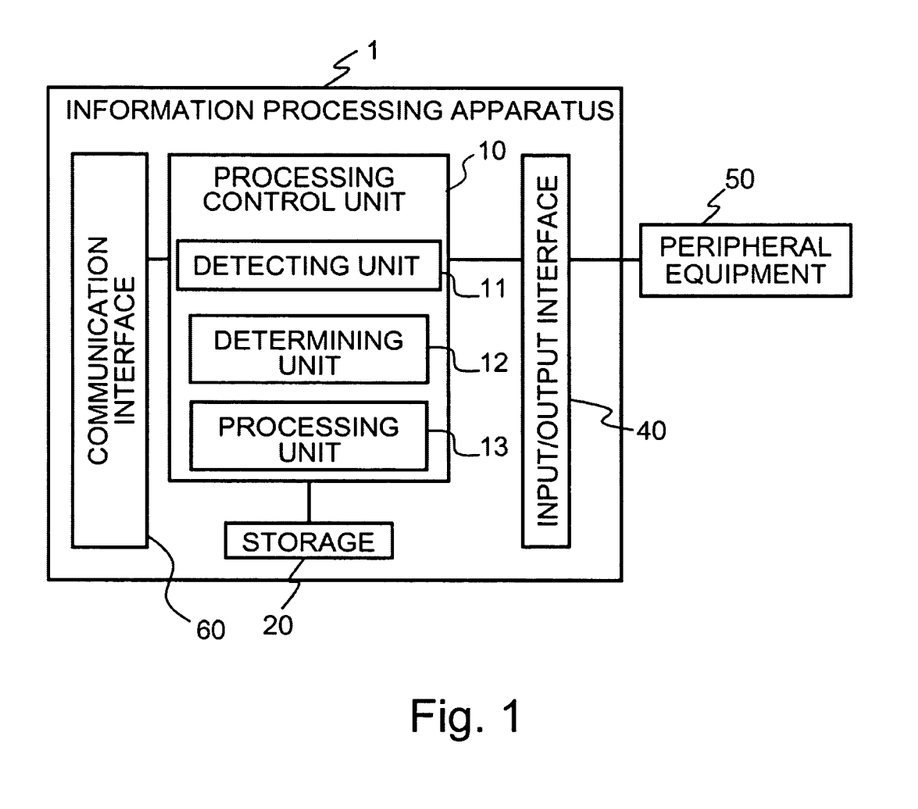
FIG. 1 illustrates a configuration of an information terminal apparatus according to an embodiment.
Figure 2:
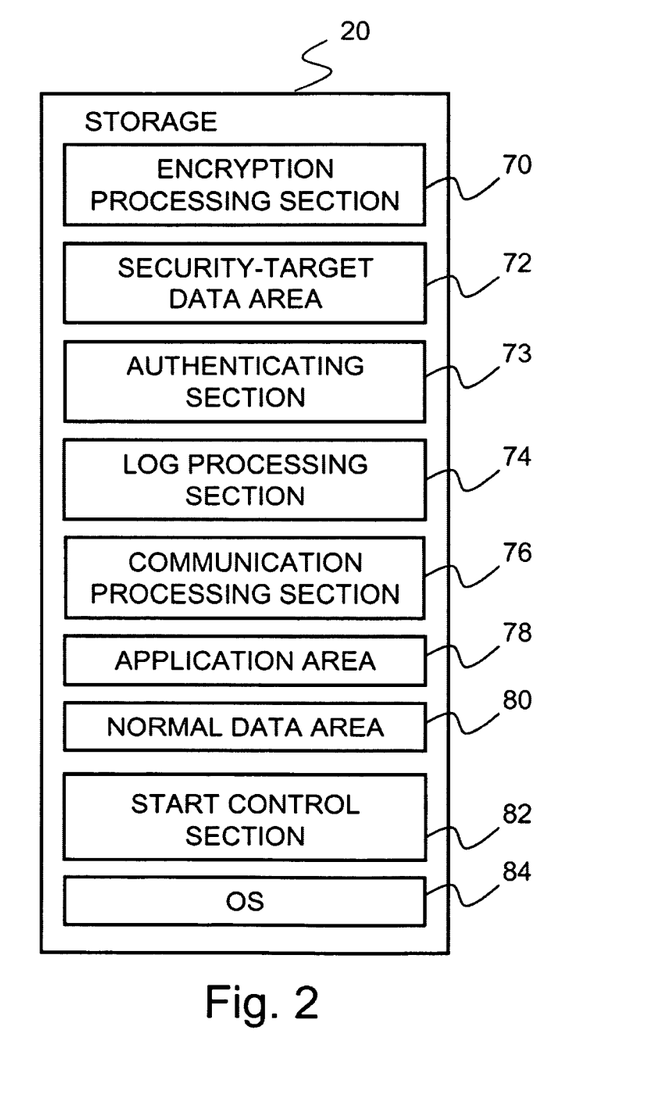
FIG. 2 illustrates a configuration of a storage unit according to the embodiment.

With reference to FIGS. 1 and 2, a configuration of an information terminal apparatus 1 according to an embodiment of the present invention and a configuration of a storage unit 20 in the information terminal apparatus 1 will be described. The storage unit 20 is preferably configured by a hard disk but may be configured by a semiconductor memory or a writable and readable recording medium or a combination of a read-only CD (compact disk) and a writable storage medium, for example.

The information terminal apparatus 1 includes functional units in a processing control unit 10 having a CPU (Central Processing Unit), including a detecting unit 11 that detects the input from peripheral equipment 50 such as a keyboard and a mouse, a determining unit 12 that performs determination processing such as comparison with a given value or condition, and a processing unit 13 that reads a program, for example, memorized/stored in a storage unit 20 and performs processing of executing an instruction described in the program. In addition, the processing control unit 10 has a function of controlling a communication interface unit 60 that can connect to a communication line, not illustrated, such as the Internet and has an interface with a communication line and an input/output interface 40 that allows connection with the peripheral equipment 50 such as a keyboard, a display device and an external storage device and exchanges information therewith.

FIG. 2 is a diagram illustrating programs, data areas, work areas and so on memorized/stored in the storage unit 20. An encryption processing section 70 stores data stored in the storage unit 20 and a program that encodes data for performing communication with a server, not illustrated, for example. A security-target data area 72 is an area that may store data with higher confidentiality and/or privacy levels according to the embodiment. An authenticating section 73 stores a program for performing authentication processing upon startup of the information terminal apparatus 1. A log processing section 74 stores a program for storing data accessed by a user or information on an access time as log information in the storage unit 20. A communication processing section 76 stores a communication program for connecting with an input or memorized/stored addressed destination through the communication interface unit 60 and a communication line. An application area 78 stores an application program. A normal data area 80 is an area for memorizing/storing data with a lower privacy level and/or data used or created for normal processing, unlike the security target data area 72 for storing data requiring a higher security level. In the present embodiment, the storage unit 20 having the two areas of the security-target data area 72 and the normal data area 80 can be used. A start control section 82 stores a program such as BIOS (BASIC INPUT/OUTPUT SYSTEM) to be started when the information terminal apparatus 1 is powered on, for example, and an OS (Operating System) is memorized/stored in an OS 84.

Figure 3:
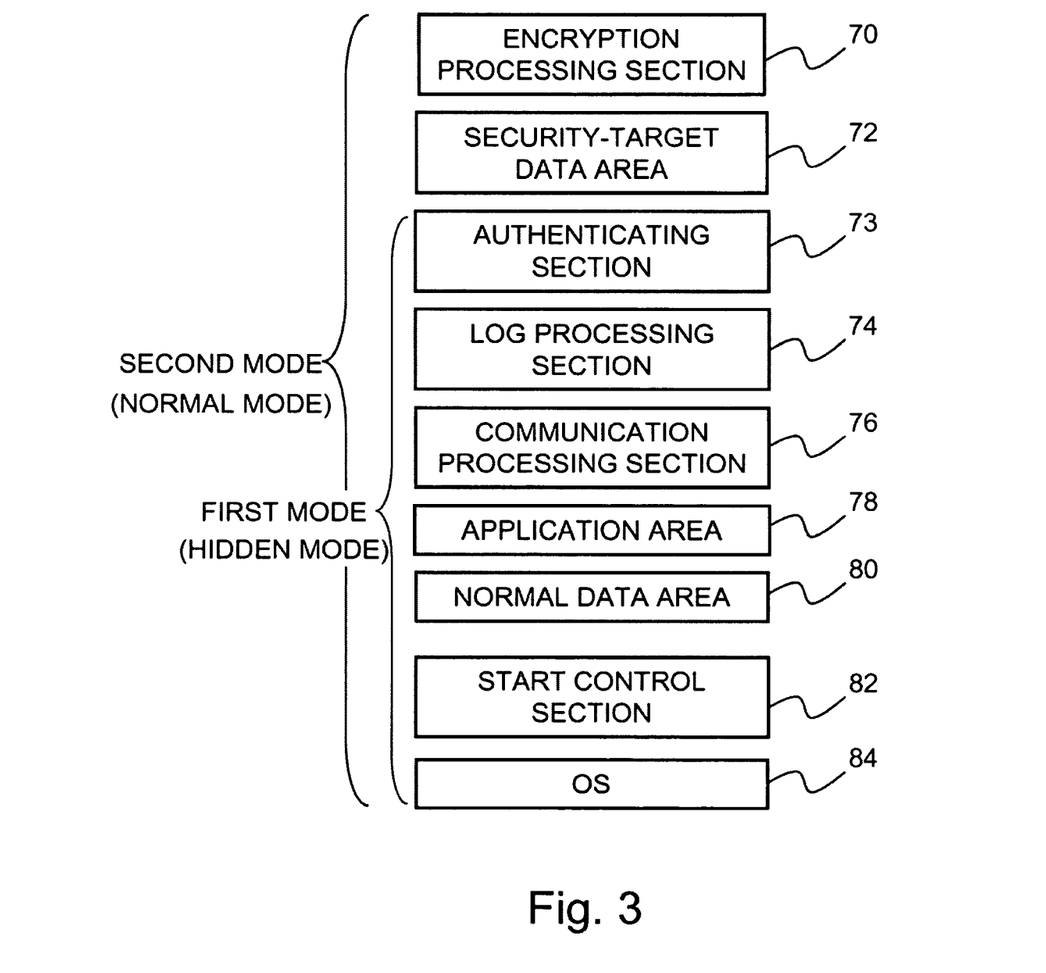
FIG. 3 illustrates relationships between programs or areas in the storage unit, and modes.

FIG. 3 illustrates relationships between the programs or data areas illustrated in FIG. 2 and two modes of the present embodiment. The reason why the operation mode is divided into a first mode, which is a hidden mode, and a second mode, which is a normal mode, according to the present embodiment is for causing a person who does not use the information terminal apparatus 1 normally to recognize that the information terminal apparatus 1 is operating normally even in the hidden mode. The second mode is for performing processing with a higher privacy level. Therefore, even while the information terminal apparatus 1 is operating in the first mode, a user who does not use the information terminal apparatus 1 normally can use the information terminal apparatus 1 without a feeling of wrongness.

The programs, data and work areas operable in the second normal mode are all of the programs and areas, and those limited including the authenticating section 73 to the OS 84 but excluding the encryption processing section 70 and the security-target data area 72 among the programs and storage areas operable in the normal mode are programs and areas operable in the first mode (hidden mode).

Figure 4:
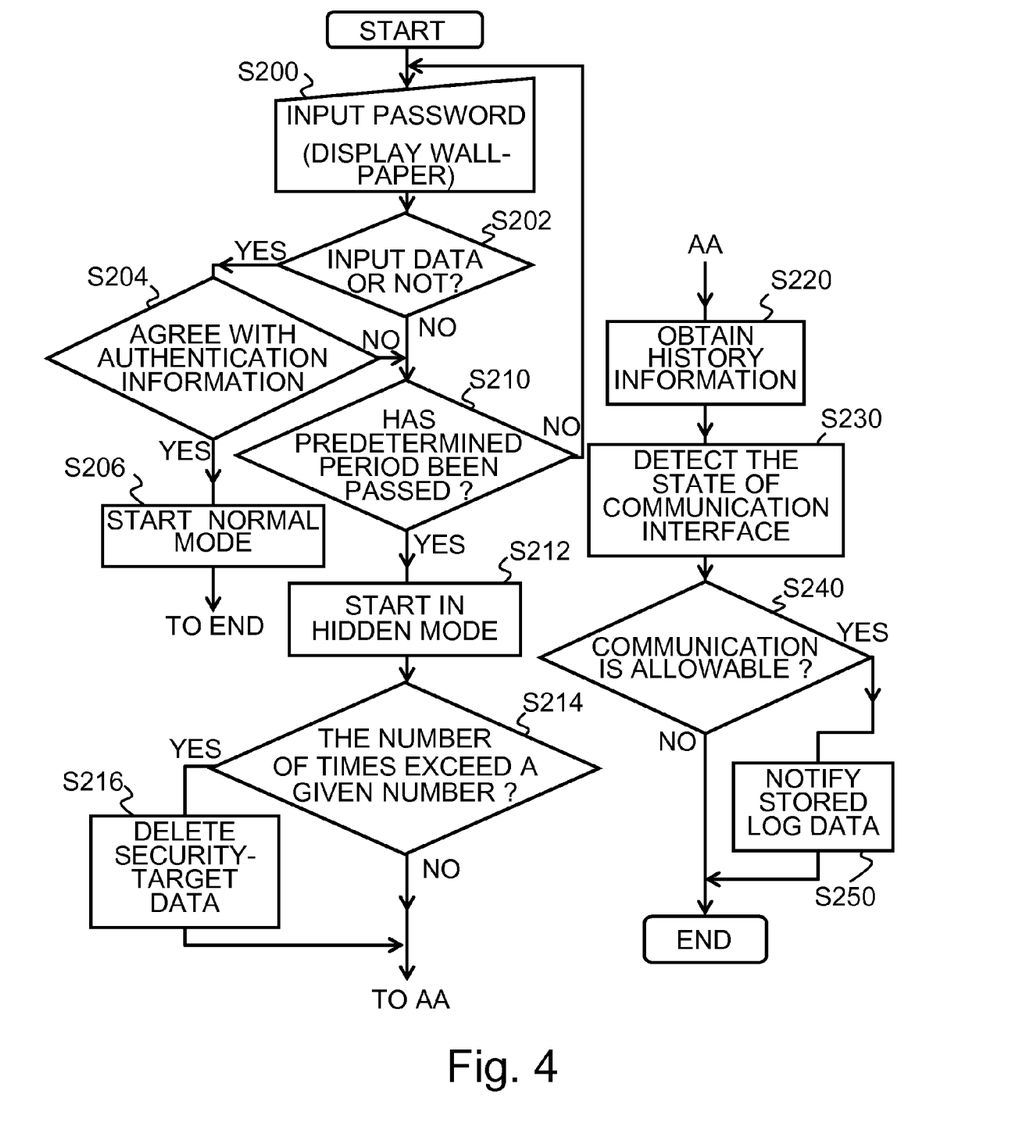
FIG. 4 illustrates a processing flow in the embodiment.

Next, operations of an embodiment of the present embodiment in the configuration above for programs and areas operable in the corresponding modes will be described with reference to the processing flow illustrated in FIG. 4. When the information terminal apparatus 1 is powered on, the start control section 82 operates, and the input screen of the information terminal apparatus 1 displays a password input screen. Here, according to this embodiment, wallpaper is only displayed on the input screen (Operation S 200), without displaying a password input screen like the input screen of a normal personal computer. With the display, the detecting unit 11 determines whether a password or the like required for the authentication has been input or not (Operation S202). If it has been input (YES in Operation S202), whether the input data agrees with authentication information stored in the information terminal apparatus 1 or not is determined (Operation S204). If the determination results in the agreement between the input data and the stored authentication information (YES in Operation S204), the system of the information terminal apparatus 1 is started in the normal mode (Operation S206). If the authentication information and the input data do not agree in Operation S204 (NO in Operation S204), the processing moves to Operation S210. Even if Operation S202 results in NO, the processing also moves to Operation S210 in which whether a given period of time has passed after the power-on of the input terminal apparatus 1 or not is determined. If the given period of time has not passed yet, the processing returns to Operation S200 and awaits the password input.

If the given period of time has passed (YES in Operation S210), the processing moves to Operation S212. This case may be a case where the data such as a password required for the authentication has not been input or a case where input data does not agree with the authentication information and the given period of time has passed. Therefore, it can be determined that the person is not a user who normally uses the information terminal apparatus 1. The information terminal apparatus 1 estimates, based on the idea, a user currently operating the information terminal apparatus 1 as one requiring cautions if the determination in Operation S210 results in YES, and the system of the information terminal apparatus 1 starts in the hidden mode (Operation S212). The number of times of processing from the start of the information terminal apparatus 1 to Operation S212 is counted and stored in the processing unit 13, for example. Therefore, whether the number of times of the start exceeds a given number or not is determined in Operation S214. The number of times of the start is preferably configured to trigger the reset if it is started in the normal mode, but the reset may be triggered in any other manners.

Figure 5A:
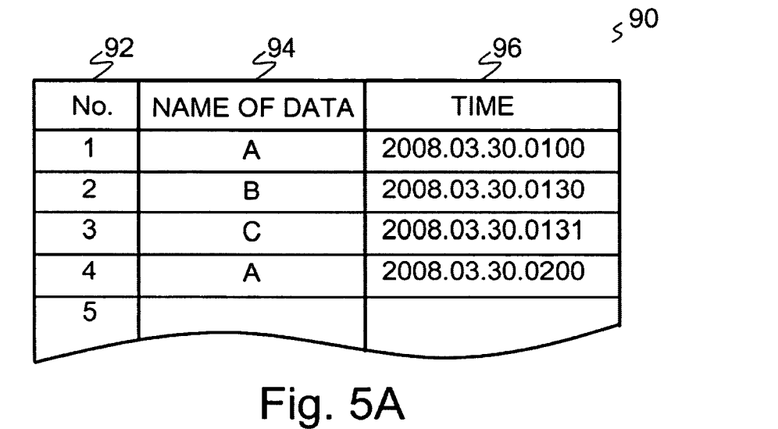
FIGS. 5A and 5B illustrate examples of recorded data of logs.
Figure 5B:
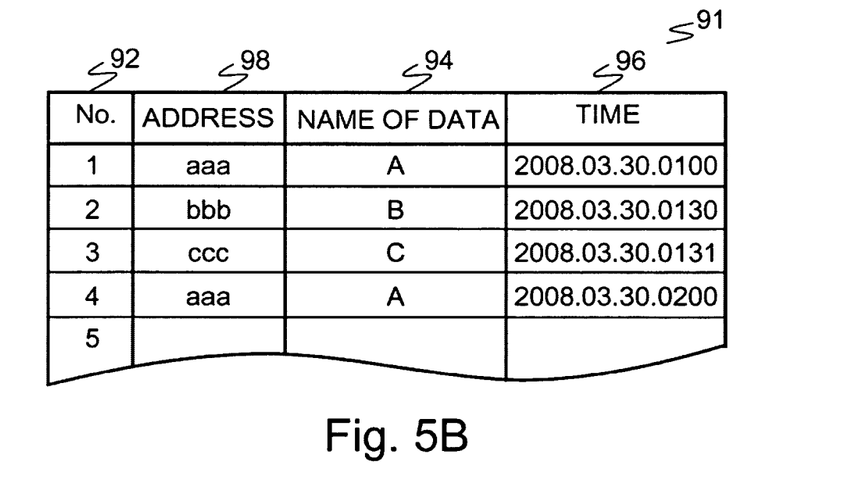

If YES in Operation S214, the number of times of the start in the hidden mode exceeds the given number of times. Therefore, it is estimated that the information terminal apparatus 1 may be used by a third party who does not know a normal usage, for example, for quite a long period of time. The data to be kept in secret in the encryption processing section 70 and/or the security-target data area 72 are deleted, destroyed or overwritten to disable to decrypt or use them such that the third party cannot discover them (Operation S216). If NO in Operation S214, currently operated data and/or history information such as times are obtained (Operation S220), and the history information is recorded as log information in the log processing section 74. An example of the recorded data of the log information—90—is illustrated in FIG. 5A. In FIG. 5A, a number column 92 indicates the order of occurrence of log data, a name of data 94 indicates the name of data accessed by operations, and a time 96 indicates the time of occurrence of an operation in order of at least one of the year, month, date and time. The history information in a case where an operation uses a communication line preferably has the format of recorded data—91—illustrated in FIG. 5B further including a communication destination address 98, in addition to the recorded data in FIG. 5A. Next, if the log information occurs and is recorded, the processing unit 13 in the information terminal apparatus 1 detects the state of the communication interface unit 60 to obtain information on whether the information terminal apparatus 1 is communicatable or not, including whether it is connecting to a communication line or not or whether a communication destination address is preset or not (Operations S230 and S240). If it can be determined that it is communicatable (YES in Operation S240), the stored log data is notified to a given communication destination (Operation S250), and the processing ends. If NO in Operation S240, the processing also ends. If NO in Operation S240 and the processing ends in Operation S250, the processing unit 13 may return to Operation S220 again to perform processing to obtain history information. Furthermore, the processing may be performed after the detection of an event such as powering-off of the information terminal apparatus 1.

In order to implement user authentication at the BIOS level when the information terminal apparatus 1 is powered on, an input time may be defined, whereby a password can be input in timing that the owner of the information terminal apparatus 1 only knows, without displaying any message for requesting a password on the screen. If a correct password is input in the timing, the owner of the personal computer may start it in a situation to be used (which is the normal mode) under its normal environment. Even if a password, for example, required for the authentication is not input, the person who has obtained the information terminal apparatus 1 may be put off his/her guard to use it continuously. Then, the information terminal apparatus 1 may be started at a state allowing the use of standard applications only (which is in the hidden mode), and the operating system may be started under a circumstance where important information and so on are not seen in files/folders. In this case, all operations by the user may be traced, and the operation histories may be stored in a hidden file. Furthermore, network setting information may be collected. The connection to a server for report may be periodically attempted, and, if the connection can be made, the collected operation histories and network information may be transmitted to the server for report.

As described above, operation history information is transmitted to the server whereby the information is analyzed. Thus, which network the information terminal apparatus 1 is connecting to or what kind of operation is being performed with that can be checked. Therefore, the person who has obtained the information terminal apparatus 1 can be located, and whether any important file has been accessed or not can be checked.

As described above, according to the embodiment, it is configured such that confidential information in an information terminal apparatus such as a personal computer stolen or lost and passed into the hands of a third party can be hidden and the personal computer can rather allow a third party to use easily. Therefore, the frequent use of the personal computer by the third party can be easily induced, and information on the position of the presence of the personal computer can be obtained if the third party connects the personal computer to a communication line. The embodiment is also configured to allow checking whether data information stored in a personal computer has been actually leaked or not if the personal computer is lost, whereby measures against the confidential information leak if any can be taken.

The invention claimed is:

1. An information processing apparatus comprising:
a non-transitory storage configured to store a first stored data, a second stored data, and a certain authentication information;
a computer processor, the processor configured to:
detect whether authentication information is inputted within a certain period of time;
determine whether the authentication information coincides with the certain authentication information;
process in a first mode having access to the first stored data when the authentication information is not detected within the certain period of time or when the authentication information detected within the certain period of time does not coincide with the certain authentication information, and to process in a second mode having access to the second stored data when the authentication information is detected within the certain period of time and coincides with the certain authentication information;
store in the storage information of a history of operation performed in the first mode; and
store in the storage a first information and a second information, the second information not being used in the second mode; and
a counter to count a number of events in which the authentication information is not detected within the certain period of time or the authentication information detected within the certain period of time does not correspond to the certain authentication information,
the processor being further configured to delete or overwrite the second information when the counted frequency of events is greater than or equal to a given number of times.

2. The information apparatus according to claim 1, further comprising a display wherein a notification urging a user to input the authentication is not displayed on the screen of the display during the certain period of time.

3. The information apparatus according to claim 1, the processor further configured to:
establish communication with a destination through a given address and transmit to the destination the information of a history of operation stored in the storage.

4. The information apparatus according to claim 1, wherein the processor is further configured to process in the second mode having access to the first stored data and the second stored data when the authentication information coincides with the certain authentication information.

5. A method for information processing executed by a computer processor, the method comprising:
detecting, by the processor, whether authentication information is inputted within a certain period of time;
determining whether the authentication information coincides with certain authentication information;
processing in a first mode having access to first stored data when the authentication information is not detected by the detecting within the certain period of time or when the authentication information detected by the detecting within the e~certain period of time does not coincide with the certain authentication information;
storing information of a history of operation performed in the first mode;
processing in a second mode having access to second stored data when in the determining the authentication information coincides with the certain authentication information, the second stored data including the first stored data;
storing a first information and a second information, the second information not being used in the second mode;
counting a number of events in which the authentication information is not detected within the certain period of time or the authentication information detected within the certain period of time does not correspond to the certain authentication information; and
deleting or overwriting the second information when the counted frequency of events is greater than or equal to a given number of times.

6. The method for information processing according to claim 5, further comprising:
establishing communication with a destination through a given address; and
transmitting to the destination the information of a history of operation stored in the storing.

7. The method for information processing according to 5, further comprising:
processing in the second mode, having access to the first stored data and the second stored data, different from the first mode when the authentication information coincides with the certain authentication information.

8. A non-transitory computer readable medium having stored therein a program for causing a computer to execute a process, the process comprising:
detecting whether authentication information is inputted within a certain period of time;

determining whether the authentication information coincides with certain authentication information;

processing in a first mode having access to first stored data when the authentication information is not detected by the detecting within the certain period of time or when the authentication information detected by the detecting within the certain period of time does not correspond to the certain authentication information;

processing in a second mode having access to the first stored data and second stored data when the authentication information coincides with the certain authentication information;

storing information of a history of operation performed in the first mode;

storing a first information and a second information, the second information not being used in the second mode;

counting a number of events in which the authentication information is not detected within the certain period of time or the authentication information detected within the certain period of time does not correspond to the certain authentication information; and deleting or overwriting the second information when the counted frequency of events is greater than or equal to a given number of times.

* * * * *